(12) United States Patent
Devkar et al.

(10) Patent No.: US 10,366,165 B2
(45) Date of Patent: Jul. 30, 2019

(54) APPARATUS AND METHOD FOR PRINTING STEGANOGRAPHY TO ASSIST VISUALLY IMPAIRED

(71) Applicant: Tata Consultancy Services Limited, Mumbai (IN)

(72) Inventors: Sujit Devkar, Thane (IN); Pankaj Harish Doke, Thane (IN); Sylvan Lobo, Thane (IN)

(73) Assignee: Tata Consultancy Services Limited, Mumbai (IN)

( * ) Notice: Subject to any disclaimer, the term of this patent is extended or adjusted under 35 U.S.C. 154(b) by 16 days.

(21) Appl. No.: 15/463,900

(22) Filed: Mar. 20, 2017

(65) Prior Publication Data

US 2017/0300474 A1    Oct. 19, 2017

(30) Foreign Application Priority Data

Apr. 15, 2016 (IN) .............................. 201621013282

(51) Int. Cl.
*G06F 17/27* (2006.01)
*G06F 3/01* (2006.01)
(Continued)

(52) U.S. Cl.
CPC ....... *G06F 17/2785* (2013.01); *G02B 27/017* (2013.01); *G06F 3/012* (2013.01);
(Continued)

(58) Field of Classification Search
CPC .................................................. G09B 21/006
See application file for complete search history.

(56) References Cited

U.S. PATENT DOCUMENTS 7,261,612 B1 * 8/2007 Hannigan ................ G09B 5/06
382/100
7,805,307 B2   9/2010 Levin et al.
(Continued)

FOREIGN PATENT DOCUMENTS

EP     2 065 871 A1    6/2009

OTHER PUBLICATIONS

Guilbourd, et al., International Conference on Mobile Computing, Applications, and Services, ICST Institute for Computer Science, Social Informatics and Telecommunications, pp. 90-97, 2013.*
(Continued)

*Primary Examiner* — Feng-Tzer Tzeng
(74) *Attorney, Agent, or Firm* — Finnegan, Henderson, Farabow, Garrett & Dunner LLP

(57) ABSTRACT

An apparatus and method for printing steganography is disclosed. The apparatus comprises a wearable unit and a controlling unit that are programmatically controlled by a processor. The controlling unit converts content to be published into a phoneme transcription for a target language, processes the content and further arranges the processed content as per a specified page layout. Further, the phoneme transcribed content is embedded into a QR code that is again extracted by a wearable unit to read the content, the content layout, and reading sequence. The wearable unit also converts the phoneme transcribed content into a voice output. Further, the wearable unit comprises motor sensors to sense a readers' body and neck movements to guide a reader to read content in a correct manner such that voice output is programmatically paused, stopped, repeated at intervals so determined.

12 Claims, 4 Drawing Sheets

(51) Int. Cl.
    *G09B 21/00*     (2006.01)
    *G02B 27/01*     (2006.01)
    *G06F 3/16*     (2006.01)
    *G06F 17/21*     (2006.01)
    *G06F 17/22*     (2006.01)
    *G06F 17/28*     (2006.01)
    *G10L 13/04*     (2013.01)
    *G10L 13/08*     (2013.01)
    *G09B 17/00*     (2006.01)
    *G06K 19/06*     (2006.01)

(52) U.S. Cl.
    CPC ............ G06F 3/165 (2013.01); G06F 17/212 (2013.01); G06F 17/2247 (2013.01); G06F 17/2735 (2013.01); G06F 17/289 (2013.01); G09B 17/003 (2013.01); G09B 21/006 (2013.01); G09B 21/008 (2013.01); G10L 13/043 (2013.01); G10L 13/08 (2013.01); *G02B 2027/014* (2013.01); *G02B 2027/0138* (2013.01); *G06K 19/0614* (2013.01)

(56) References Cited

U.S. PATENT DOCUMENTS

| 2001/0056342 | A1* | 12/2001 | Piehn | G06F 17/289 704/3 |
|---|---|---|---|---|
| 2010/0235160 | A1* | 9/2010 | Heiner | G06F 17/289 704/2 |
| 2012/0064951 | A1* | 3/2012 | Agevik | G06F 3/012 455/569.1 |
| 2012/0328215 | A1 | 12/2012 | Thong et al. | |
| 2013/0046541 | A1* | 2/2013 | Klein | G09B 21/006 704/260 |
| 2014/0267650 | A1 | 9/2014 | Wexler et al. | |

OTHER PUBLICATIONS

Guilbourd et al., "Geometric Layout Analysis in a Wearable Reading Device for the Blind and Visually Impaired", International Conference on Mobile Computing, Applications, and Services, ICST Institute for Computer Science, Social Informatics and Telecommunications, pp. 90-97, (2013) https://link.springer.com/chapter/10.1007/978-3-319-05452-0_7.

\* cited by examiner

Figure 1: Components of Device for Printing Steganography

Figure 2: System Modules of Device for Printing Steganography

APPARATUS AND METHOD FOR PRINTING STEGANOGRAPHY TO ASSIST VISUALLY IMPAIRED

PRIORITY CLAIM

This application claims priority under 35 U.S.C. § 119 from India Application No. 201621013282, filed on Apr. 15, 2016. The entire contents of the aforementioned application are incorporated herein by reference.

TECHNICAL FIELD

The present disclosure relates to the field of content management more particularly to a system and method for printing steganography to assist visually impaired.

BACKGROUND

There is a vast amount of information that is published on paper and in the digital media. However, a lot of this information is not accessible to persons with disability. Media houses and the publishing industry have realized the need to produce an accessible content. One of the reasons include being compliant to regulations that require accessible content to be distributed, so that one section of society is not at a disadvantage. Also, technology has made it possible for media houses to create accessible content—although in a limited format and mode. Currently available systems and methods cater to persons with visual impairment by way of converting text to voice, printing content in braille or equivalent format after content is created and published. However printing text in braille is time consuming and the end output is voluminous. Also, printed content is not available real-time to a visually impaired audience, as distribution of accessible content takes place much after original content is published. An Accessible content format is not available simultaneously as original content. This is one of the major drawbacks in creation and distribution of accessible content.

Typical methods of producing accessible content comprise extracting text from an image captured, and further converting the text to speech. The converted speech can in turn be paused, stopped to suit the readers pace. Currently available methods do not take into account the content layout, the manner in which content must be read, additional features such as allowing a reader to look up the meaning of words, bookmark certain sections of content is not available. These features enhance the reading experience of a reader. Further, content arrangement or layout has an intent to grab a reader's attention. Certain aspects like layout, colour schemes and arrangements make content more engaging. Content, which is arranged in a typical layout or content that is written using a combination of scripts (English and Devnagiri) needs to be appreciated by the audience, this is challenging, given the fact that a portion of the audience is impaired through vision.

OBJECTIVES OF THE INVENTION

In accordance with the present disclosure, the primary objective is to provide an apparatus and method for printing steganography to assist the visually impaired.

Another objective of the disclosure is to enable content creation and management for publishers such that content is available in real time to sighted users as well as users with a visual impairment.

Another objective of the invention is to create a word processing mechanism for generating an accessible format of text to be published.

Yet another objective of the invention is to provide a layout marker to decode a layout of a document to be published.

Yet another objective of the invention is to programmatically control a reading apparatus to read the accessible format of the content.

Another objective of the invention is to enable the reading apparatus to navigate the reader using sensors attached to the reading apparatus through the layout of the document to read accessible format of the text.

Other objects and advantages of the present invention will be more apparent from the following description when read in conjunction with the accompanying figures, which are not intended to limit the scope of the present disclosure.

SUMMARY

The following presents a simplified summary of some embodiments of the disclosure in order to provide a basic understanding of the embodiments. This summary is not an extensive overview of the embodiments. It is not intended to identify key/critical elements of the embodiments or to delineate the scope of the embodiments. Its sole purpose is to present some embodiments in a simplified form as a prelude to the more detailed description that is presented below.

In view of the foregoing, an embodiment herein provides an apparatus for printing steganography to assist a visually impaired person to read content. The apparatus comprises a memory comprising instructions, and a processor programmatically coupled to a controlling unit and reading unit. Controlling unit (200) comprises a phoneme text processor (202) and a layout manager (206). The wearable unit (300) comprises a reading module (302), a navigator module (306), a content decoding module (304) and an I/O module (308). The controlling unit receives content at the time of publication and converts the content into a phoneme representation of said content in the specified language, encodes and compresses the content and further configures the layout information of the content to be published. The phoneme text processor (202) converts content into a phoneme representation and super imposes the phoneme representation on content, encodes and compresses said content and further arranges content in a grid-like pattern within a specified page layout and converts the encoded content pattern into a QR code. Further, the layout manager (206) comprises generation of content markers to determine position of encoded content in the page layout, and to determine instances of content formatting. The wearable unit is configured to read the content encoded by the controlling unit through a plurality of modules. The Reading module comprises capturing the QR code through a camera attachment and a light emitting attachment. Further, a content decoding module (304) decodes the content, and said content is converted to a voice output by am I/O module (308). The Navigator module (306) comprises sensors that detect body-neck movement of a reader and is accordingly configured to issue instructions to the I/O module to stop, pause or repeat voice output.

In yet another aspect, an embodiment herein provides a method to read a published content by a wearable unit and controlling a wearable unit to read the content. Further, the controlling comprises generating a phoneme representation of a printed content and encoding said phoneme representation to arrange in a specified layout. The reading comprises capturing phoneme representation of content, decoding the layout information, measuring body and neck movements to determine reader orientation and to facilitate a reader in reading content and further converting the phoneme representation into a speech or voice output.

BRIEF DESCRIPTION OF THE DRAWINGS

The foregoing summary, as well as the following detailed description of preferred embodiments, are better understood when read in conjunction with the appended drawings. For the purpose of illustrating the invention, there is shown in the drawings exemplary constructions of the invention; however, the invention is not limited to the specific methods and apparatus disclosed in the drawings.

DETAILED DESCRIPTION

Figure 1:
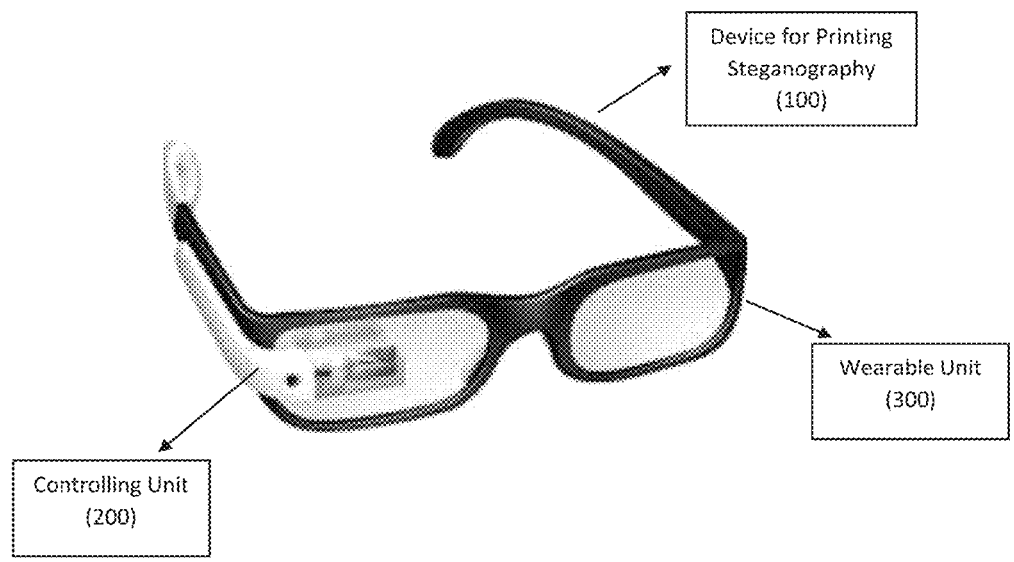
FIG. 1 illustrates a schematic of an apparatus for printing steganography for visually impaired users.

Some embodiments of this disclosure, illustrating all its features, will now be discussed in detail.

The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present disclosure, the preferred, systems and methods are now described. In the following description for the purpose of explanation and understanding reference has been made to numerous embodiments for which the intent is not to limit the scope of the disclosure.

One or more components of the concept are described as module for the understanding of the specification. For example, a module may include self-contained component in a hardware circuit comprising of logical gate, semiconductor Apparatus, integrated circuits or any other discrete component. The module may also be a part of any software programme executed by any hardware entity for example processor. The implementation of module as a software programme may include a set of logical instructions to be executed by a processor or any other hardware entity.

The disclosed embodiments are merely exemplary of the concept, which may be embodied in various forms.

Method steps of the application may be performed by one or more computer processors executing a program tangibly embodied on a computer-readable medium to perform functions of the invention by operating on input and generating output. Suitable processors include, by way of example, both general and special purpose microprocessors. Generally, the processor receives (reads) instructions and data from a memory (such as a read-only memory and/or a random access memory) and writes (stores) instructions and data to the memory. Storage apparatus suitable for tangibly embodying computer program instructions and data include, for example, all forms of non-volatile memory, such as semiconductor memory apparatus, including EPROM, EEPROM, and flash memory apparatus; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive (read) programs and data from, and write (store) programs and data to, a non-transitory computer-readable storage medium such as an internal disk (not shown) or a removable disk.

The present application describes an apparatus that will enable a visually impaired person to read content presented in a plurality of layouts, the Apparatus comprises a controlling unit and a wearable unit. The controlling unit comprises a phoneme text generator to convert content at the time of publication into phoneme-encoded content and the layout manager generates content layout information for each page of content into a layout map which is further read by the wearable unit. The wearable unit comprises a reading module, a navigator module and an I/O module, wherein the reading module reads the phoneme-encoded content, the navigator module (206) reads the content layout information and guides the reader to read the content in the correct order and the I/O module generates a voice output at the time of reading the content to the reader.

According to an embodiment of the present invention, an apparatus (100) for printing steganography to assist visually impaired is displayed in FIG. 1. The apparatus (100) is implemented in conjunction with a reading apparatus, which is programmatically controlled to render content to a visually impaired reader. The apparatus (100) renders content that can be read by visually impaired readers at the same time when content is being published for a sighted population. One of the benefits of the apparatus (100) explained herein is to eliminate the delay in publishing accessible content by a publisher.

The apparatus (100) comprises a wearable unit (300) and a controlling unit (200). In an embodiment, the wearable unit (300) comprises a smart eyewear that can be programmatically controlled through a microprocessor and a memory (not shown in the FIG. 1). The smart eyewear is available off-the-shelf from entities such as Google, Vuzixs and others, except that the apparatus is programmatically controlled to detect additional signals such as neck movements to assist a reader as explained in the subsequent paragraphs.

According to an embodiment of the invention, the controlling unit (200) performs the objective of processing content and reading the content to convert it into an accessible format for a visually impaired user. The controlling unit (200) reads content by converting these into phonemes and super-imposing the phoneme-text on the actual source content. In addition, the controlling unit (200) also de-codes the format of the content and creates a layout map to guide the wearable unit (300) to read the content. The wearable unit (300) actually reads by producing an audio output of the content for the visually impaired user. In an embodiment, the wearable unit (300) produces an audio output of the phoneme mapped content as per the navigation path encoded in the layout map. The wearable unit (300) also facilitates the user to navigate the content by detecting and measuring neck and body neck muscle along the content format. In an embodiment, the wearable unit (300) comprises a reading module to convert the phoneme-mapped content into audio content, further the phoneme-mapped content can be bookmarked to store the last accessed location and the content can also be translated into languages that are stored in the apparatus (100) memory.

Figure 2:
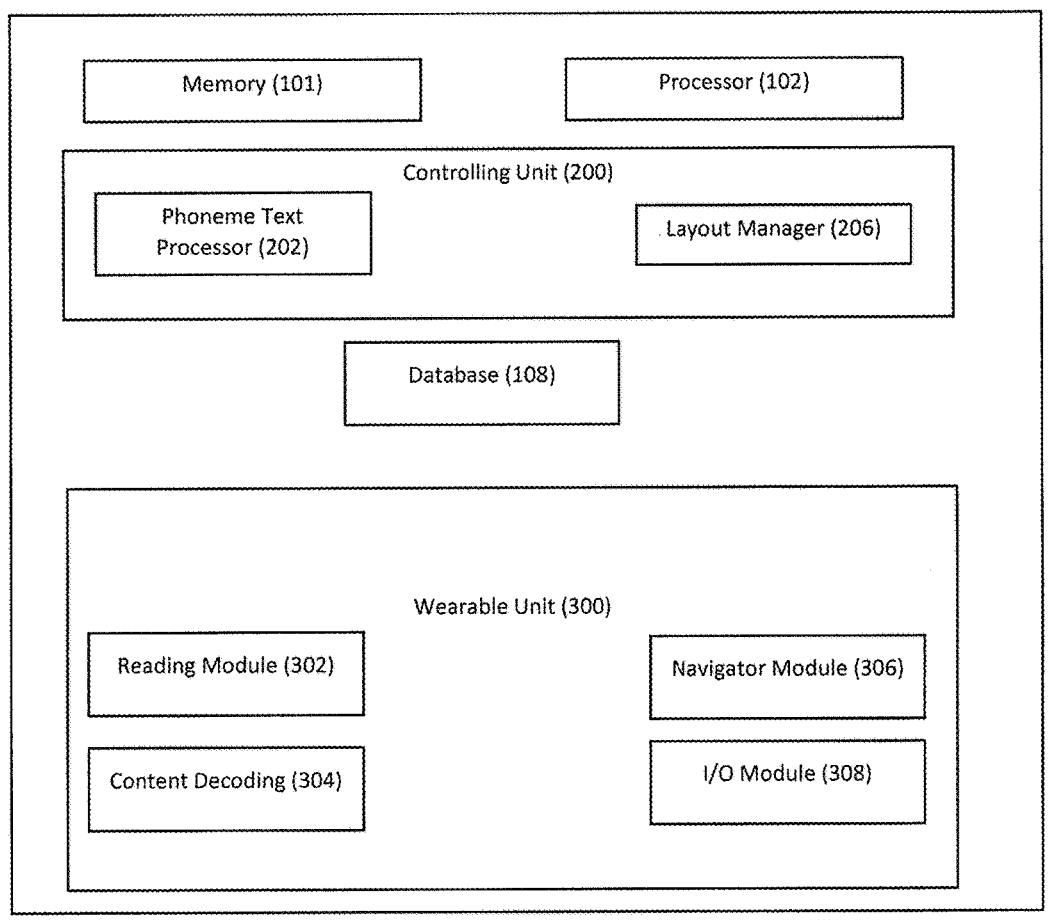
FIG. 2 illustrates a detailed block diagram of the components of the apparatus for printing steganography for visually impaired users.

Embodiments of the invention are now explained with respect to FIG. 2. The controlling unit (200) comprises a phoneme text processor (202) and a layout manager (206). The phoneme text processor (202) receives content created by the authors from the I/O module (308) at the time of publication and converts the content received into phoneme transcription. This is to ensure that the correct pronunciation of a written word is captured correctly and presented to the reader. In an embodiment, the phoneme text processor (202) captures phonetic details of the content created by the author, using known techniques available in the art. For instance, a phonemic representation of the English word 'Hello' in the content will be represented as 'hə -'lō', at the time of phoneme transcription. Phonemic transcription, renders the system to be independent of scripts.

In an embodiment, the phoneme text processor (202), further encodes the phoneme transcription for error correction and redundancy. The phoneme transcription for each word in the content is compressed using lossless text encoding techniques into small block level. Compression is performed using known algorithms available in the art. The encoded phoneme transcription for every word is converted into block levels for redundancy and is further compressed to a block data (D). In an embodiment, a plurality of such blocks is created for the content present in a page. Each of the block data (D) is of a specific size—comprising dimensions of length and width. Further, each of these blocks is arranged in a pattern on the page layout. Also, in an embodiment, the phoneme representation is printed as a ghost text, which is visible on a further operation (explained in subsequent sections) by the wearable unit (300).

In an embodiment, a publisher prints content "Hello World Lorem ipsum dolor sit amet, consectetur adipiscing elit. Etiam aliquam diam et libero auctor, a sodales elit viverra. Nulla maximus bibendum elit, sed maximus diam. Nulla lobortis auctor velit, at vulputate eros vulputate vel. Vivamus at sodales nisi. Aenean iaculis auctor sollicitudin. Ut iaculis commodo aliquam. Duis rhoncus lacinia dolor, luctus efficitur felis semper vel. Quisque vitae sagittis turpis. Nulla laoreet suscipit commodo. Fusce in cursus massa".

As a first step, the phoneme text processor (202) transcribes the text into a phoneme representation—hɛˈleʊ w3:ld. In the next operation, the phoneme text processor (202) performs a compress operation and computes the checksum to ensure that the compressed text when uncompressed later, has integrity that is, the compressed text is the same as that of original text.

A representation of the said phrase subsequent to a compress operation is below.

eNpdVUty2zAM3Wcmd+ABNLoTTcE2En4UftROj9HpxpN9Fr5GVuqp+
iCSkt1NHMkkgPfBsw2RnLLbX55TcWoKeFJpvWelHeVBmeATmUy5R
KUnnjkZ9hdFlvOoKLN2Slv+KPic5GH9zMryiWJQupgc4qBlpTBpS2m7
pRZeKEY9K1+s1crpn+xKUidc8hNGkEODSjTtX0nhftyGU4iZU6uulnr8+
wuFi51L1pnUeo86PTzjOCh9tVSTo30gz4lHpcmT9oq1KfaonlK1bDiXif2o
St6/N8G5MlWOe1RTWW+VLwGb1DfajDEull5KltqeEvn81YsqvP6add7
Akl3U6yzfRROHwWD6re83lTSF84CEufB+l5dQynC9AUizKCyTTKqM
94A9s0rUyK+Vu77K623Ub2+yEuyxGewC2gXdLEkl0GYCx2oaiuVMR
Xu7w4Ymxll4kuKGlyfKTryWaSSAvNVR8pRbo/D7gaBVlU4qD8UaeAf3
DUKrBlDckr0ZDuWoxOjVfdlHSpEj85wxwUyJu7O8evnu5rW+zuYdN2L
x8yVYogWPBlhpr3vwLfBxh2GEO9MiDKth0k8iU7i1RfgoMx0wGsUbiQ
PD2NvE4E/HlEaw+6UnTnMb4+W23E4UEyojSkuaVy6RL3wBFv9/b3eU
g7gdhqOdYBUJR1GelrbaEqTCu0YWGd4VLTsxmGfMWrpUYDKvf+Mj
8zbGgvlh4CyOWC1XFjKvL60HeodGhWeT1cJAlwzcSNappdZ1j9RvN6V
etb/in8iRXhc5mx2RqUNSMrY7p4eEKFo8EKyyUb2vvnikLwudN/TtiGx5
CiB192zx4DgrMWXmnKQKZG1ssR9jza2cfet6LeWVc0NLUEXujL2Sj8u
0nr3ALrpF6vlNadKx3cU6RGz3+7JUGXpgfAYUZ1Xaklec2eQ6pm94al4O
LF4s6dL3al5pEKgq/l/C3HcmYtdGDw+wm+7tDl5eNlUuvQL1eJPk3XrVj
pdiCeu+AH74oFq0ZEltGrKbN7FJuQ98Dbzosf7D4nb7vF9E3qeHTgP3uY
SUVm6DXs5J8OlVs1pMuQhAxbBwnFSWo6axxQ8NmTP8aG1bXT3nU7
fXzP/T8ASbMkzAPXsr3sm9Lc3/bdUfj4PGBth/wA8DP+E A checksum of the compressed text is expressed in a hexadecimal system which is read as B218E72294FDFB5E1081618D30E4A726.

The next operation performed by the phoneme text processor (202) is to convert the compressed checksum for data redundancy. The compressed data is in the binary format. The objective of performing this operation is to ensure that complete data can be recovered even if the printed pages have been damaged, folded, has a stain, or have partly been torn—in such instances the compression technique has been used at the instance of printing/publishing the text, hence text or content can be recovered. This operation expands the message without addition of information. A representation is below.

```
0110010101001110011100000110010001010110010101011010011110
0100110010011110010100000101001101001100110101011011000110110
1101011001000010000010000010100000100100111001001100011011101
0101000101010001100011010001010011001001000101011011100011010
0101010101100110011101000101001001001111011010101000111001010010
0001110000011110000111100000010011100011100101000110011100100011
0101010001110101011001110101011000101110000001000000110100101
0000110101001101101101101110100001100010010011100100100001001101
0110101101101011011001110101000011001100100000100111001101111
1100110010010010011011110010010010011000101110010001000110110
0101001101010101000110011010101011101101111010010110100101
0001100010010011100000111011001010111011001010110110001001000
0110010101011001000010011011010110010100000101010100011011
0101010101011100100110101010100100100101110101010101110101010110011
1110011010010011011010110110000111001001011010000011001001001100011011001
1011000110110010011110110111010010011100011000100110100010
0101001101101100011101100010000001001011010100000111010101000
1100110101010001110101001000011100010111101000100101011001010111
1001011010010101011101001010101000101110101011100000001100011101
1000110010100011100010001000100100110111100000010110010001000010
0111000001010011011001001010010011101010011011101110000101001000010110
```

```
1001100101010010110100010101011001001110010100101011011000010
0000011100110011000101100011011100100111000001101110001000001
1100001001011010101011010010110010001100011001110000110100
0100111001000111011010110100010101001111010001000101001101010
1001010100001101100010110000011000001101110011010000110011001111
0100011110010100011101010100011010001101001010110100101010100
1101100111010101110101101010001101110011100100011100000010000
0111011011101010010001100110100100110101001100010100100011100
0101110000010110010010101001010111011110011100010110010101
0000010101000111101001101010001100000100001101101010001011100101
1101000101010100100110101010001101111001100110010010000011001100
0001001110000100010001010000001000000100010100111101111001
```

In a subsequent operation, the binary output is converted to block data (D) by the phoneme text processor (202) using techniques known in the art. Block data (D) can be decimal, hexadecimal, or a base 64 encoded string. In an embodiment, block data (D) is a base 64 encoded string. A representation of the base 64 encoded string is as below.

```
6LES6HMLNHvCdf1JJDNOsra8452JanlL5HZHJ95RZHLPdHlJsevl71uS4
uvHd8rHrPrSN0WQKDJQtGnJaXDQsjdK6P2StSoKcyCJ69ODJLKOrTlls
L6ld1sLsLil6LMGcrbGLHjLNarKajLRcvgQrevQ6H6R7PFRqjCJZ9JR7O
Wlr1fOpL7l3bwJN9vQLTAKNLmPsCqSK99S5H2S5CoRJTmKbfblqLPE
Kji87CnOt9mRY1ulrLfP6CuQ4v7QqLFH5DgL7HOC6vePdHvHrKqQLfL
DdLrR6voE21tTKPfDJ5CCN1kLMLlE3PGL7fgC4DeENHMKrHlCp1dU
ZHil71ZRLGvRt4nlsPXRsv9lp5YH6bOQMOoRrDqDYzEE4SrJKbNJsKn
KbHNLo0lLantHs8nH6PXQaH5TMn9DKj9T75bHNPkE35PSt5sK3PXP6
GtGMj9CrKsUNfcKb9Fl7TNH3PoPJWpR5HJHZWqGqLrPa8WlJLaKNbk
Gpb1LMbwlqDvL5HBSKqvD44vSp1oLNbB85PrDpTBDZ8pLM8o87b5T
NbuHsLtGp9dM6HCHMj9C4TPGtWoRs5fTLPDKbXrDtSqMMrulMmqQ
tLBHsnvPajKSdbNOLDJGNPELb8uS59YC2z4DsTXGbP9LJHnH3XLOM
L1PZD4LKjoGcn4OsjoC5f4TLTlU4zgLcPalKXJS4LgE3LtU7TLUKfrDqy
uPNPkTJLoLo1wTLbaJZ9CU3XvLbblPrTGGcneS78pTdTCPa9uQ397HK
yvJMb4ltHeC6iuQLKtQKblPcTlJNWmTqTpLM9fKL14CavsHJH5BqX9H
M5t83PLRbHkJM8q85SoCqKqLKLvRsfJQtLXLdasKampTq96TZalOZDb
LMStPsHeSKzaMK9Llb8nHsLiSc9XHN5KGtKmMLT7P3HMJ5HPU6r7P
arNSd1LMKHBTcOWJMeuUc97PtPiQ3H3UKzNGp5OHcfBTamsC4XbRs
H7Q5TbL35Zla59TtfZKqvXS71aMZ5gEL9sJZPMPNHYBsbkE6blM6XZD
MruCb9nLKvJJN9PDt0qPKLBHcyuHKjvULLYCdPsRcbhJ7TrP4ulL7HfH
tWrGsb2CJaoUdWqH6ToJLTORMvBKKjQHp5pSr8vQdfXCcDcPNGsJ6L
NLcCmJanLHLXrQamoKseuTJ1kSZD1J79mHZPslKvXP4juCsDLDb97UZ
CWDqfLHrXmPsP1MLLQCLXXQsnbOp9bKJPmRJaqOMmqJqn6D7CsP4
mpOKarS4LBPt4lR2z3CqXZRLbqP4T4To1tRl0tT4HiDMLElLLrTb5CCM
LAK6iPM79MQd1aQKDbTl11l3SqRqPnC5f5R7H7SajYJZT6ldLHEJX4Od
flSsOtH3HkOZTsHZb5Ct5bl5HdK3DrMLDLLcqsH5XpDKeuJsnMSp5mJ
NLHQ45uOa9tRaPJLsysONXuKJXERLHGE657CM9OL3DkLJTcM7fGBr
GuGLDYJMjwGL1OSt8pSsqvJ6CpBs9aLMP9D517GdHeBtT1E4HG84Kzv
```

In yet another subsequent operation, the phoneme text processor (202) adjusts the font of the encoded base 64 string to a size that can be captured without losing clarity by the camera attachment of the wearable unit (300). The font adjusted encoded base 64 string is input to the layout manager (206) to arrange the block of text on a page.

The layout manager (206) receives the font adjusted encoded base 64 string and dimensions of the page layout on which the content is to be printed. The layout manager (206) prepares markers to enable the wearable unit (300) to read the content. The markers are stored in an xml file format in the I/O module (308). In an embodiment, the layout manager (206) generates two types of markers. The first marker marks co-ordinates or location of redundant data in the content. In an embodiment, the page layout of the content is first read by the Layout Manager (206) and a page layout grid is created to mark location co-ordinates to determine location of a block data (D).

Further, the layout manager (206) identifies a location on the page layout on which the block data (D) will be arranged. In an embodiment, block size for block data (D) can be determined as X×Y and P×Q. Block sizes determine a pattern for the data to be arranged on the page layout grid. Block data (D) is arranged starting from left-top.

In yet another embodiment, the layout manager (206) generates a second marker to indicate reading sequence, pauses in content, emphasis in content, and tags for formatting inserted in the content. In an embodiment, the marker data is stored in an .xml file. In an embodiment, formatting further comprises meta information such as font size, font style, font colour, references, footnotes, images, image labels, formulae. The Layout Manager (206) uses this meta information to introduce a pause at the event of creating an audio output for reading the content to the reader.

Figure 4:
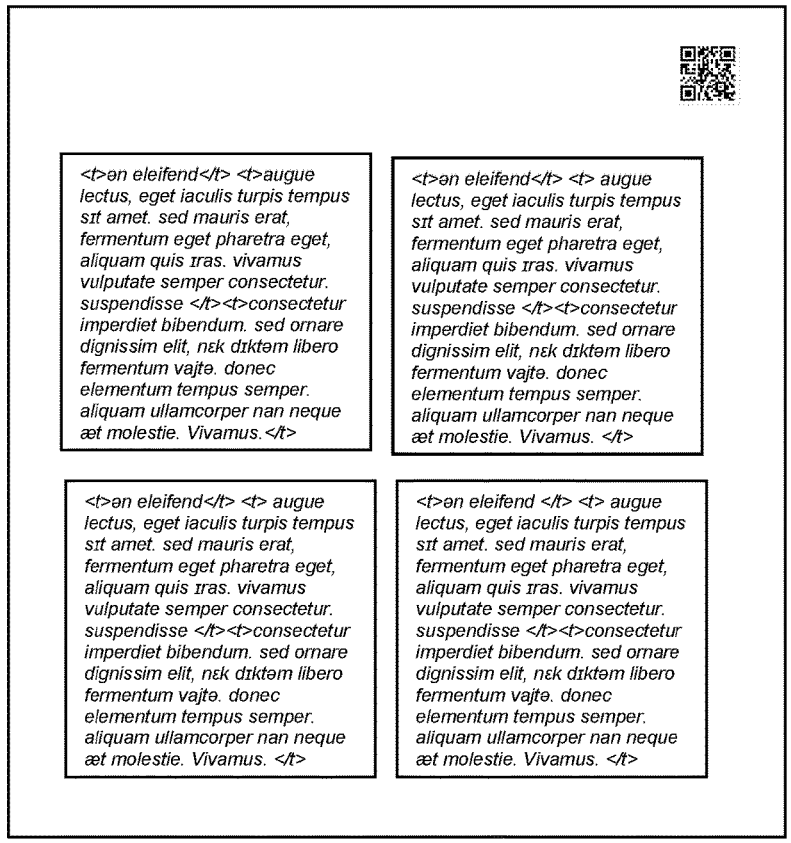
FIG. 4 illustrates an example of block data including a QR code.

Further to explain reading sequence, there are instances where an extract from a text appears in between paragraphs or an image is pasted between text. In yet another embodiment, the layout manager (206) creates an encoded output of the page layout in a Quick Response (QR) code, which is printed across the page of content. The output from the Layout Manager is a printed representation for each page of content, wherein each page of content comprises encoded phoneme blocks (D), a first marker and a second marker and a QR code. Further, encoded output of the page layout generated can be read by transmission of infra-red or ultra violet light emitted by a reading module (302) of the wearable unit (300). A representation of the block data (D) with a QR code representation of the content is shown in FIG. 4.

The wearable unit (300) is used to read the processed block data (D) and the QR code to decode the content in an accessible format for a reader. The wearable unit (300) comprises a reading module (302), a content decoding module (304) and a navigator module (306). The wearable unit (300) comprises a programmatically controlled eyewear apparatus, in the present embodiment, the eyewear apparatus comprises a smart goggle to read content. The program controls to enable the wearable unit (300) to read the content stored in the memory (101) and is controlled by a processor (102).

In another embodiment, the wearable unit (300) further comprises orientation and motion sensors that detect the reader's body and neck movements. The motion sensors facilitate the reader to navigate through the encoded reading sequence. The objective of the motion sensors is to mimic way in which sighted persons read content.

The reading module (302) of the wearable unit (300) comprises a camera and a UV light emitting attachment to capture the content being read. In an embodiment, the camera component of the reading module (302) along with the UV light emitting attachment captures the QR code embedded in each page of the content. The QR code and the phoneme block data (D) is read in a light spectrum outside of the visible light spectrum. In an embodiment, an ultra violet spectrum is used to read the QR code and block data (D).

The content decoding module (304) module extracts the xml data from the QR code read by the reading module (302). The extracted xml data, is read by the content decoding module (304) to store the phoneme block data (D), the first marker and the second marker, which was previously generated for each page of the content by the layout manager (206). Thus, the content decoding module (304), extracts the encoded xml data, comprising location map generated by the layout manager (206).

The reading module (302) comprising of the UV light emitting attachment, emits UV light on the page of content. The superimposed block data (D) comprising phoneme representation of content can now be read by the wearable Apparatus (302). In an embodiment, the camera apparatus attached to the wearable unit (300) determines page orientation. The captured page orientation is compared with the xml data—this is to determine if the reader is orienting the camera in the correct direction. Camera orientation determines how reader reads the content printed on a document. In an embodiment, if the camera is not oriented correctly, reader is instructed by the navigator module (306), and audio commands are issued by the I/O module (308) to move up, down left or right, so that the camera can capture encoded block data (D) correctly.

The content decoding module (304) parses the encoded phoneme data present in the document layout. Data is de-compressed and error correction techniques are applied. Corrected data is then decoded into phoneme form. A checksum of recovered phoneme data is obtained, which is further matched with checksum read from the QR code.

Recovered phoneme data is matched with phonemes of a language stored in a database (108). This determines the language in which content has to read out to the reader by the I/O module (308). In an embodiment, the database (108) comprises mapped phoneme transcription for languages that can be configured by a user, in an embodiment the user can be a publisher who publishes content, further the database (108) comprises dictionaries in configured languages and translation of content from one configured language to another target configured language.

The navigator module (306) measures body and neck movements, and accordingly inserts pauses while reading out content in a speech form through the I/O module (308). As stated earlier, the wearable unit (300) comprises sensors in the navigator module (306) to enable a visually impaired read content in the same way as a sighted reader would. In an embodiment, the navigator module (306) computes an average time taken to read content. This value is stored in the .xml file, which is further stored in the layout manager module (206) of the controlling unit (200). The sensors of the navigator module (306) measure orientation across x, y and z axis. The orientation so recorded is used to perform functions that include at least one of pause, play, stop, and reduce speed, repeat and so on.

In an embodiment, a swift next movement of the reader will cause the I/O module (308) to pause audio of the content. Similarly, in yet another embodiment, a nodding movement detected by the sensor may cause the I/O module to slow the speed of audio. In another embodiment, a slight inclination of the head can indicate that the reader is listening attentively to the content, which can again lower speed of audio or cause the audio to repeat. In yet another embodiment, a sudden drop of the head, can indicate that the reader is drowsy and can cause the audio output to stop.

The navigator module (306) also causes the reader to orient towards the content to be read. In an embodiment, the navigator module (306) issues direction commands through the I/O module (308) that enable a reader to orient themselves towards the content to be read.

Further, in yet another embodiment, the navigation module (206) implements machine learning algorithms to calculate user orientation and perform user orientation correction after determining the body and neck movements of the reader. Machine learning takes into account body movement studied over a period of time and results in better decision making to improve user experience. In yet another embodiment, the navigation module (206) is pre-learned with the orientation data of the body and neck movements of a sighted person. These movements can be mimicked by the navigation module (206) for a visually impaired reader, and commands for correcting the readers body movements are issued by the navigation module (206).

Figure 3:
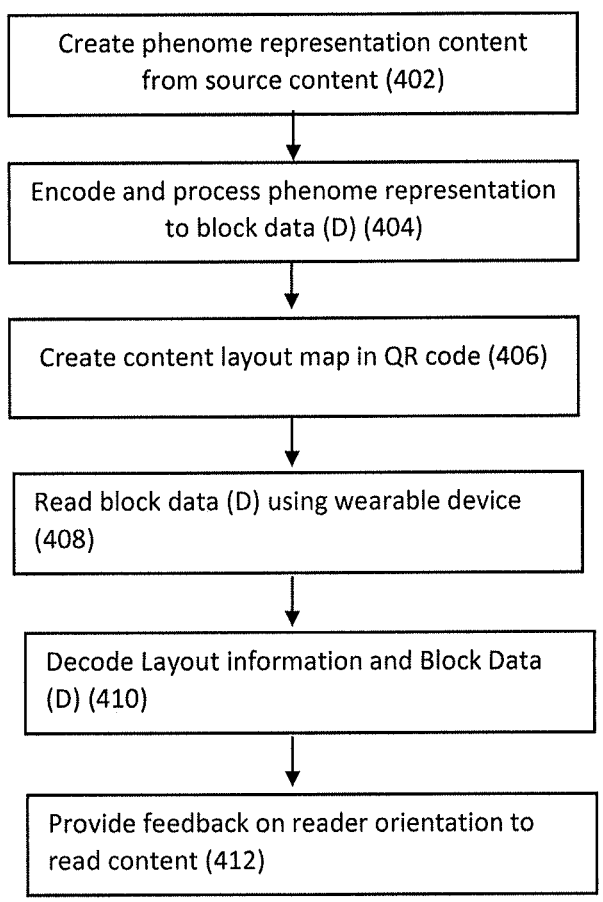
FIG. 3 illustrates a flow diagram depicting process steps involved in rendering content using steganography for visually impaired users.

According to an embodiment of the invention, a method for printing steganography is elaborated with reference to FIG. 3. The first step (402) is generating phoneme representation of the source content to be published by a publisher. Phoneme representation is created for the language of the source content using methods that are known in the art.

In the next step (404), phoneme transcription is encoded and compressed so that it can be arranged suitably on a page layout. In step (404), phoneme representation is first compressed, and in a subsequent sub-process, a checksum of the compressed phoneme content is determined. This operation determines that there are no losses in the compression process. Further, in an embodiment, the compressed text is converted to redundant text. This sub-process ensures that no additional content is inserted in the encoded text, however, this step ensures that there are no accidental changes to phoneme representation of content. In an embodiment, redundant text is in the binary form. Further, redundant text is converted to a base 64 encoded string, now termed as block data (D). In yet another operation, the font size of the base 64 encoded string is further reduced so that it can be suitably read by the camera attachment of the wearable unit (300).

In step (406), the block data (D) is arranged within the page layout comprising markers and a QR code, so that content can be read by the apparatus (100) after it is published. In an embodiment, in step 406, a page layout is visualized in a grid form with a co-ordinate system to arrange the block data (D), as per the size of the block data (D). In an embodiment, a first marker comprises the block data (D) that is arranged in the layout co-ordinate from left-top co-ordinate. Further, a second marker indicates reading sequence, pauses in content, emphasis in content, and tags for formatting inserted in the content. In an embodiment, the marker data is stored in an .xml file. Further, meta information such as font size, font style, font colour, references, footnotes, images, image labels, and formulae is indicated in xml tags in the second marker. Next, the block data (D) with the marker and page layout is further encoded in a QR code. The final output of step 406 is a page layout representation of phoneme representation comprising the first marker data, the second marker data, the QR code presentation arranged in a grid format of the page layout.

In step (408) and (410), the block data (D), the first marker data, second marker data and the layout data of step 406 is encoded and de-compressed using techniques known in the art by the wearable unit (300).

Further in step (412), the layout data, the first marker data and the second marker data is converted from text to speech to assist and facilitate a visually impaired user to read the content. Further, in an embodiment, first and second marker data embedded in the .xml in conjunction with neck and body movements recorded by sensors in the wearable unit (200) generates audio commands that enable a reader to pause, stop and repeat reading of the content.

The preceding description has been presented with reference to various embodiments. Persons having ordinary skill in the art and technology to which this application pertains will appreciate that alterations and changes in the described structures and methods of operation can be practiced without meaningfully departing from the principle, spirit and scope.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The preceding description has been presented with reference to various embodiments. Persons having ordinary skill in the art and technology to which this application pertains will appreciate that alterations and changes in the described structures and methods of operation can be practiced without meaningfully departing from the principle, spirit and scope.

What is claimed is:

1. An apparatus for printing steganography to assist a visually impaired reader, the apparatus comprising:
   a memory storing instructions;
   a processor coupled to said memory, wherein said processor programmatically controls:
   a controlling unit configured to generate steganography to be embedded in a printed product before it is published, the controlling unit comprising:
      a phoneme text processor for processing a content of the printed product to be published; and
      a layout manager for generating an xml file comprising a content layout map, markers and QR code for each page of the processed content, wherein the layout manager is further configured to generate a grid with location co-ordinates as per page layout; arrange a block data (D) as per the location co-ordinates; and generate markers to enable reading of the block data;
   a wearable unit coupled to the controlling unit, wherein the wearable unit further comprises:
      a reading module coupled with a light emitting device and a camera attachment for processing the processed content, wherein the reading module of the wearable unit further captures the QR code and the block data (D) using the camera attachment and extracts the phoneme data using ultra violet light emitted by the light emitting device;
      a navigator module further comprising sensors for determining neck and body movements in navigating through the processed content;
      an I/O module for outputting an audio signal corresponding to the processed content to be published in a specific manner thereby printing steganography, wherein the specific manner is further described as a stop or a pause or a repeat command from the navigator module for the output audio signal; and
   a database to store content translation and dictionaries to assist in reading.

2. The apparatus as claimed in claim 1, wherein the phoneme text processor processes the content to be published into a phoneme transcription and the phoneme transcription of the content is further encoded to comprise the block data (D).

3. The apparatus as claimed in claim 1, wherein the layout manager further:
   creates a first marker to mark location co-ordinates of block data (D) in a page layout and determine a smallest area in a page layout to fit marked block data in a sequential pattern;
   creates a second marker to mark reading sequence, pause in content, and formatting in content; and
   embeds the first markers and the second marker in a QR code in the page layout, wherein the QR code and block data (D) is super imposed for each page of content; and further the QR code and block data (D) is visible in an ultra violet light spectrum generated by the wearable unit.

4. The apparatus as claimed in claim 1, wherein the camera attachment further determines an initial position of the reader with respect to the content to be read, wherein the position co-ordinates are communicated to the navigator module.

5. The apparatus as claimed in claim 1, wherein the navigator module further comprises:
   measuring user orientation for neck and body movements across x, y and z axis through sensors;
   computing an average time to read at least one page of the content layout; and
   application of machine learning techniques to co-relate neck and body movement of a reader to a programmatic command comprising at least one of stop, pause, slow and repeat.

6. The apparatus as claimed in claim 1, wherein the I/O module further comprises converting the content to a speech format and further responding to programmatic commands of at least one of stop, pause, repeat, and slow speed of speech as per body neck movements measured by the navigator module.

7. A method for printing steganography to assist a visually impaired reader, the method comprising:
   generating, by a controlling unit, steganography to be embedded in a printed product before it is published by:
      processing content to be published by a phoneme text processor of the controlling unit;
      generating a content layout map, makers and a QR code for each page of processed content by a layout manager of the control unit, wherein the generating of the content layout map further comprises generating a grid comprising location co-ordinates of a page layout, arranging a block data (D), generating a first marker, a second marker and generating a QR layout code for navigation;
   extracting the processed content by a reading module of a wearable unit, wherein the reading module of the wearable unit further captures the QR code and a block data (D) using the camera attachment and extracts the phoneme data using ultra violet light emitted by the light emitting device;
   determining neck and body movements in navigating through the processed content by a navigator module of the wearable unit; and
   outputting an audio signal corresponding to the processed content to be published in a specific manner thereby printing steganography by an I/O module of the wearable unit, wherein the specific manner is further described as a stop or a pause or a repeat command from the navigator module for the output audio signal.

8. The method as claimed in claim 7, wherein the processing further comprises generating a phoneme representation of content and further converting to a block data (D).

9. The method as claimed in claim 7, wherein the generating the content layout map further comprises creating a first marker to mark location co-ordinates of block data (D) and further determine a smallest area in a page layout to arrange block data (D) in a sequential pattern; and a second marker to mark reading sequence, pause in content, and formatting of content.

10. The method as claimed in claim 9, wherein the first marker and the second marker are further encoded in a QR code, wherein said QR code is embedded in the page layout.

11. The method as claimed in claim 7, wherein the extracting the processed content further comprises
  capturing block data (D) by camera attachment and parsing the block data (D) using a light emitting device;
  extracting layout information from the QR code;
  measuring body and neck movements by a navigation module to determine reader orientation; and
  converting block data (D) to a speech output by an I/O module.

12. The method as claimed in claim 7, wherein the determining the body and neck movements further triggers programmatic commands to pause, stop, repeat or slow the speech output.

* * * * *